United States Patent [19]
Anderson

[11] Patent Number: 5,955,973
[45] Date of Patent: Sep. 21, 1999

[54] FIELD NAVIGATION SYSTEM

[75] Inventor: Noel W. Anderson, Fargo, N. Dak.

[73] Assignee: Concord, Inc., Fargo, N. Dak.

[21] Appl. No.: 08/861,077

[22] Filed: May 21, 1997

Related U.S. Application Data

[63] Continuation of application No. 08/436,870, May 8, 1995, Pat. No. 5,684,476, which is a continuation of application No. 08/176,098, Dec. 30, 1993, abandoned.

[51] Int. Cl.⁶ .................................................. G08G 1/123
[52] U.S. Cl. .................... 340/988; 340/995; 340/994; 340/689; 701/50; 701/213; 701/215; 701/216; 342/107; 342/357; 342/457; 111/130; 221/1; 239/1
[58] Field of Search ..................................... 340/988, 995, 340/994, 689; 701/50, 200, 213, 215, 216; 342/107, 357, 457; 111/130; 221/1; 239/1

[56] References Cited

U.S. PATENT DOCUMENTS

| Re. 35,100 | 11/1995 | Monson et al. | 111/130 |
|---|---|---|---|
| 3,789,198 | 1/1974 | Henson et al. | 701/217 |
| 4,231,093 | 10/1980 | LaVance et al. | 701/300 |
| 4,286,151 | 8/1981 | Lestradet | 250/230 |
| 4,382,178 | 5/1983 | Mori | 377/17 |
| 4,459,667 | 7/1984 | Takeuchi | 701/207 |
| 4,490,717 | 12/1984 | Saito | 340/996 |
| 4,496,996 | 1/1985 | Moriyama et al. | 360/12 |
| 4,630,773 | 12/1986 | Ortlip | 239/1 |
| 4,731,613 | 3/1988 | Endo et al. | 342/357 |
| 4,743,913 | 5/1988 | Takai | 342/457 |

(List continued on next page.)

OTHER PUBLICATIONS

R. J. Palmer, Progress Report of a Local Positioning System, ASAE Proceedings on Automated Agriculture for the 21st Century, Dec. 16–17, 1991, at pp. 403–408.

J. V. Stafford et al., Sensing and Mapping Grain Yield Variation, ASAE Proceedings on Automated Agriculture for the 21st Century, Dec. 16–17, 1991, at pp. 356–365.

W. E. Larsen et al., Using the GPS Satellites for Precision Navigation,ASAE Proceedings on Automated Agriculture for the 21st Century, Dec. 16–17, 1991, pp. 201–2808.

Geoffrey Shropshire et al., Field Experience with Differential GPS, ASAE/CSAE Presentation, Jun. 20–23, 1993.

Tom Hunter and Javad Ashjaee, Land Navigation and Fleet Management with GPS, Loran, and Dead Reckoning Sensors, IEEE, 1988.

Marvin Stone and Mark Zachos, Straight Talk: Proposals Identify Common Communications Protocol for Electronics in Agricultural Machines, Agricultural Engineering, Nov. 1992.

(List continued on next page.)

Primary Examiner—Benjamin C. Lee
Attorney, Agent, or Firm—Foley & Lardner

[57] ABSTRACT

A location system is used in a vehicle moving within an area at a selected speed and in a selected direction. A heading sensor provides a heading signal representing the direction of movement of the vehicle. A speed sensor provides a speed signal based on available reference signals representing the speed of the vehicle. A storage device stores initial position data representing a selected initial position of the vehicle and checkpoint data representing a navigation checkpoint location. A database stores a plurality of records which each include geographic information data representing selective aspects of the area. A processor estimates a current position signal representing an estimated current position of the vehicle based on values of the heading signal, values of the speed signal, the initial position signal, and on previous values of the current position signal. Values of the current position signal correspond to records stored in the data base. A correction device selectively corrects the current position signal based on selected position inputs which indicate an approximate vehicle position relative to the navigation checkpoint location. An alerting device obtains an alerting signal indicating that the vehicle has reached a selected region within the area based on the current position signal and the geographic information data.

21 Claims, 2 Drawing Sheets

U.S. PATENT DOCUMENTS

| | | | |
|---|---|---|---|
| 4,792,907 | 12/1988 | Ikeda et al. | 701/208 |
| 4,812,845 | 3/1989 | Yamada et al. | 340/995 |
| 4,814,711 | 3/1989 | Olsen et al. | 324/331 |
| 4,821,192 | 4/1989 | Taivalkoski et al. | 701/25 |
| 4,823,138 | 4/1989 | Shibano et al. | 342/457 |
| 4,827,420 | 5/1989 | Musa | 701/208 |
| 4,831,539 | 5/1989 | Hagenbuch | 701/207 |
| 4,835,691 | 5/1989 | Rotem et al. | 701/23 |
| 4,837,700 | 6/1989 | Ando et al. | 701/213 |
| 4,884,208 | 11/1989 | Marinelli et al. | 701/300 |
| 4,891,761 | 1/1990 | Gray et al. | 701/219 |
| 4,899,285 | 2/1990 | Nakayama et al. | 701/220 |
| 4,903,212 | 2/1990 | Yokouchi et al. | 701/216 |
| 4,928,106 | 5/1990 | Ashjaee et al. | 342/352 |
| 4,949,268 | 8/1990 | Nishikawa et al. | 701/216 |
| 4,950,118 | 8/1990 | Mueller et al. | 414/274 |
| 4,973,970 | 11/1990 | Reeser | 342/357 |
| 5,014,206 | 5/1991 | Scribner et al. | 701/207 |
| 5,050,771 | 9/1991 | Hanson et al. | 222/1 |
| 5,075,693 | 12/1991 | McMillan et al. | 342/457 |
| 5,119,101 | 6/1992 | Barnard | 342/357 |
| 5,134,407 | 7/1992 | Lorenz et al. | 342/352 |
| 5,144,317 | 9/1992 | Duddek et al. | 342/357 |
| 5,146,231 | 9/1992 | Ghaem et al. | 342/419 |
| 5,155,490 | 10/1992 | Spradley, Jr. | 342/357 |
| 5,179,519 | 1/1993 | Adachi et al. | 701/216 |
| 5,189,430 | 2/1993 | Yano et al. | 342/457 |
| 5,220,876 | 6/1993 | Monson et al. | 111/130 |
| 5,260,875 | 11/1993 | Tofte et al. | 701/50 |
| 5,276,451 | 1/1994 | Odagawa | 342/357 |
| 5,293,318 | 3/1994 | Fukushima | 701/216 |
| 5,467,271 | 11/1995 | Abel et al. | 364/420 |
| 5,684,476 | 11/1997 | Anderson | 340/988 |

OTHER PUBLICATIONS

Water Proof Fish Finder/Loran/GPS 4040 Advertisement.

Carolyn Petersen, Precision GPS Navigation for Improving Agricultural Productivity, GPS World, Jan. 1991, at pp. 38–44.

Richard B. Langley, The GPS Receiver: An Introduction, GPS World, Jan. 1991, at pp. 50–53.

William D. Bauer and Mitch Schefcik, Using Differential GPS to Improve Crop Yields, GPS World, Feb. 1994, at pp. 38–41.

Edward J. Krakiwsky, Innovations in Vehicle Tracking and Navigation, GPS World, Feb. 1994, at pp. 42–46.

KVH Pinpointed for $18 Million U.S. Army Contract, GPS World, Feb. 1994, at p. 52.

Tak–Lap Tsui, A Prototype Design of a Computer–Controlled Spreader System for Prescription Farming Technology, Master of Science Thesis, North Dakota State University, Dec. 1991.

Arrowsmith Shelburne, Inc. Navigation Module Advertisement, GPS World, Dec. 1993.

Arrowsmith Shelburne, Inc. Navigation Module Technical Brief.

FIELD NAVIGATION SYSTEM

RELATED APPLICATIONS

This application is a continuation application of U.S. patent application Ser. No. 08/436,870, filed May 8, 1995, entitled "Field Navigation System," now U.S. Pat. No. 5,684,476 which is a continuation application of U.S. patent application Ser. No. 08/176,098, filed Dec. 30, 1993, entitled "Field Navigation System," abandoned Jun. 12, 1995.

BACKGROUND OF THE INVENTION

The present invention relates generally to location systems, and in particular, to systems for providing a position of a moving vehicle in an area such as a farm field.

Agricultural practice has typically prescribed that chemicals, fertilizers, seed, and other such crop related substances be applied at one application rate for an entire field. By contrast, modern precision agriculture involves location-specific application of agricultural substances. In precision agriculture, site specific application rates are varied according to locally determined requirements based on the spatial variability of parameters such as soil type, moisture distribution, and fertility. Purely economic pressures and such environmental concerns as reducing pesticide residues on produce and reducing fertilizer leaching in soil are compelling farmers to abandon the one rate per field method of application for the location-specific application method used in precision agriculture.

In precision agriculture, a location system provides information representative of the farm implement position in the field. This position information is typically coupled to a microcomputer which is located on the farm implement. The microcomputer is typically part of a geographic information system (GIS) which stores application rates required for the various locations in the field in a GIS database. An index into the GIS database is formed based on the farm implement position within a specified location. The indexed application rate is retrieved from the GIS database and is used to instruct the implement to apply the prescribed application rate to the field. Such factors as soil acidity, soil type, soil fertility, slope, moisture distribution, elevation, and the like may be considered to determine the prescribed application rates to be stored into the GIS database.

The application rates provided by the GIS may vary in response to information obtained from sensors on the implement itself. These sensors rapidly sense relevant soil and crop parameters and are used to collect data on spacial variability across a field. Data may be collected in real-time to provide real-time control signals for automatic control of farm implement operation. In addition, historical data may be gathered and stored in the GIS database during field operations allowing data from the current and previous seasons to be integrated into the GIS database. In this way, the GIS is utilized to manipulate and overlay data and produce a computerized control map controlling subsequent field operations. The sensors typically sense such parameters as soil moisture content and soil nitrate levels. These types of sensors are used in conjunction with soil maps, manually obtained soil samples for nutrient analysis, and agronomic expertise to develop fertilizer application rate maps which can be stored in the GIS system.

Actuators control the actual application of the agricultural chemicals, fertilizer, and seed based on the rate calculation provided by the GIS system. Both the sensors and the actuators are often controlled with nearby micro-controllers. A controller area network (CAN) standard is being developed to reduce implement wiring requirements and promote inter-operability between agricultural equipment from different manufacturers. In the United States, this CAN standard is an extension of the draft SAE J1939 truck and bus protocol which is described in Society of Automotive Engineers, *Recommended Practice for Serial Control and Communication Network (Class C) for Truck and Bus Applications (Draft J1939)*, Oct. 1, 1992, which is herein incorporated by reference. This protocol is one of three proposals which are currently being suggested to the International Standards Organization which are discussed in Marvin Stone and Mark Zachos, *Straight talk: Proposals Identify Common Communication Protocol for Electronics in Agricultural Machines*, Agricultural Engineering, Nov. 1992, at 13–16, which is herein incorporated by reference.

Various technological advances have made the variable rate method a more cost-effective alternative to the one rate method of application. Nevertheless, the cost of a location system which provides real-time information representing farm implement position currently makes the variable rate method an expensive alternative for many agricultural applications because of the accuracy required in precision agriculture. Several methods are currently used to obtain real-time farm implement location such as radio beacons and dead reckoning. Dead reckoning is accomplished with such devices as ground speed radar, odometers, speedometers, flux compasses, and the like. Odometer measuring devices, however, do not work well in agricultural applications because of wheel slippage in wet fields.

The global positioning system (GPS) is currently being evaluated as a method to obtain real-time implement location within a field. The GPS system includes a set of satellites put in orbit by the U.S. military which continuously transmit very precise timed radio signals on two frequencies. GPS receivers on mobile vehicles receive these radio signals. A GPS receiver monitors signals from several satellites and calculates the transit time of the signal from each satellite. The distance from each satellite to the receiver is calculated using this transit time information. In this way, the position of the receiver on the mobile vehicle can theoretically be determined by knowing the distance from three satellites. A fourth satellite signal is monitored to determine the altitude of the receiver and to refine the position determination. The receivers' time estimate is adjusted until the calculated distances from the four satellites converge to a single point. If, however, altitude information is known, then only three satellites are needed.

The distance calculation from each satellite to the receiver requires accurate information on the position of a given satellite at a given time. Nevertheless, the satellites are in non-geosynchronous orbits which causes the satellites' position relative to the receiver to change at a rapid rate. Consequently, the radio signals include information that permits the receiver to model each satellite's orbit as a function of time. Ground based radar stations monitor the satellites' orbits and periodically transmit updated orbit information to the satellites. The accuracy needed for the timing information make it cost prohibitive to generate timing information within the receiver so the satellite signals are used to supply the timing information.

Differential GPS utilizes a stationary receiver at a known location to improve the accuracy of the GPS positioning information. The stationary receiver receives signals from satellites and calculates its own position and the distance from each satellite according to the GPS signals. Since the actual position of the base station is known, the errors in the satellite signals are accurately calculated. This error information can be stored for later post processing or transmitted to a mobile receiver over a radio link in real-time. As of Jun. 14, 1993 the GPS system had at least 23 navigational satellites disposed around the earth in such a way that it is possible to take a bearing on and communicate with at least four satellites simultaneously from any position on the earth at any time. By communicating with at least four satellites, a differential GPS system provides a level of accuracy of approximately ±10 meters in terms of absolute real-time positional measurement. A more accurate measurement is possible through post-processing the GPS positional data. Post processing, however, is not acceptable during the application of substances onto the field because vehicle position must be known at the time applications are being made.

Because a differential GPS system uses a stationary receiver in conjunction with a mobile receiver. The material cost of the differential GPS system is relatively high as a result of the need for a base station and a communication link to the mobile GPS receiver. Thus, a more cost effective alternative to real time differential GPS is needed for field machines using location-indexed databases for controlling their action.

As mentioned above, the inherit accuracy obtained with a differential GPS system is approximately ±10 meters. The military, however, added a selective availability feature to the GPS system to prevent hostile forces from obtaining very accurate position information at a very low cost. When the selected availability is switched on the GPS system accuracy is reduced by the intentional insertion of errors into the satellite orbit information and into the time information in the radio signals from the satellites. When switched on, selective availability degrades the system accuracy to approximately ±100 meters. Nevertheless, special military GPS receivers decode information encoded on both the satellite signals to obtain accurate positions even when the selected availability feature is turned on. Presently, selective availability is almost always on, and the military gives no warnings when it does turn off the selected availability feature.

SUMMARY OF THE INVENTION

The present invention relates to a location system for use in a vehicle moving within a selected area at a selected speed and moving in a selected direction. The location system includes a heading sensor for providing a heading signal representative of the selected direction of movement of the vehicle, and a speed sensor for providing a speed signal based on available reference signals. The speed signal represents the selected speed of the vehicle. A storage device stores initial position data indicative of a selected initial position of the vehicle and further stores checkpoint data indicative of a navigation checkpoint location. A database stores a plurality of records which each include geographic information data representing selective aspects of the area. A processor estimates a current position signal representing an estimated current position of the vehicle based on values of the heading signal, values of the speed signal, the initial position signal, and on previous values of the current position signal. Values of the current position signal correspond to records stored in the database. A correction device selectively corrects the current position signal based on selected position inputs which indicate an approximate vehicle position relative to the navigation checkpoint location. An alerting unit obtains an alerting signal based on the current position signal and the geographic information data stored in the database. This alerting signal indicates that the vehicle has reached a selected region within the area.

DETAILED DESCRIPTION OF THE PREFERRED EMBODIMENTS

Figure 1:
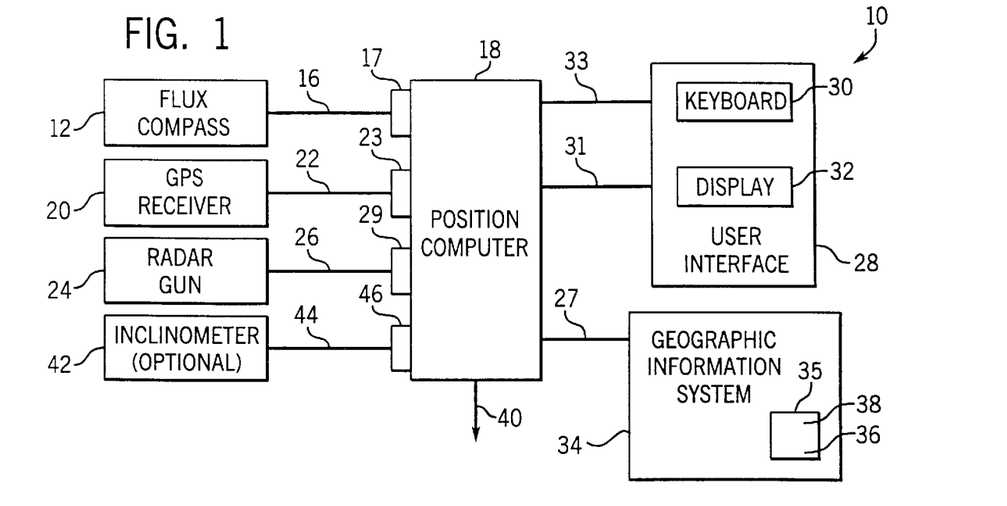
FIG. 1 is a block diagram of a land navigation system according to the present invention.

A location system, according to the present invention is generally indicated at 10 in FIG. 1. Location system 10 is intended to be used in a vehicle moving in an area such as in a farm implement traveling in an agricultural field. Location system 10 provides an inexpensive and accurate position indication which can be used in a precision agricultural application. More specifically, location system 10 provides a real-time implement position indication so that data from a location indexed database can be used to control the vehicle's actions.

Precision agriculture positioning has several levels of precision such as:

| | |
|---|---|
| Field level: | 1000 Meters |
| Soil test sample level: | 10 Meters |
| Row level: | 0.1 Meters |
| Seed level: | 0.01 Meters |

Location system 10 is designed for the 10 meter level where the system is used in varying the rate of chemicals, fertilizer, and seed inputs in response to soil test results and/or yield history of the field. At this level of precision, precision agriculture systems provide for selective spraying of agricultural chemicals such as pesticides, herbicides, and fertilizers, and also provide for variation in seed application. Furthermore, expense and yield correlation of selected regions can easily be accomplished.

Referring to FIG. 1, a flux compass 12 senses the heading of the vehicle. Flux compass 12 is mounted on the vehicle and indicates the direction in which the front portion of the flux compass is pointed, even when the vehicle is motionless. Flux compass 12 provides a heading signal on line 16, representative of the heading of the vehicle, to a position computer 18 via a communication link 17. A global positioning system (GPS) receiver 20 is also mounted on the vehicle. GPS receiver 20 derives speed information, representing the current speed of the vehicle, and provides a GPS speed signal on line 22, representative of the current speed of the vehicle to position computer 18 via a communication link 23. GPS receiver 20 derives the speed information contained in the GPS speed signal based known techniques such as by using the Doppler frequency shift of the GPS signals from GPS NAVSTAR satellites due to the relative motions of the vehicle and NAVSTAR satellites. GPS receiver 20 also provides a GPS heading signal, representing the current heading of the vehicle, on line 22 when the GPS receiver indicates that the speed of the vehicle is over 8 kilometers per hour (k.p.h.). This GPS heading signal is provided to position computer 18 via communication link 23. GPS receiver 20 also provides a gross geo-position signal on line 22 to position computer 18. Without the gross geo-position signal, the vehicle operator would have to enter geo-position coordinates to establish the gross location of the area of vehicle operation.

A suitable GPS receiver 20 is the Trimble Acutime GPS receiver. The Trimble Acutime GPS receiver has an accuracy of 0.02 meters per second when selective availability is disabled. The Trimble Acutime receiver updates speed information once per second. Other available GPS receivers provide comparable accuracy and update features. The speed error typically averages out to near zero in the time it takes a vehicle to move down the field. In fact, one component of the error is speed spikes. In a refined embodiment of the present invention, the spikes are filtered out. As a result, the typical maximum displacement in the error accumulated from GPS error is probably under 0.02 meter per second with selective availability turned off. However, vehicle acceleration and deceleration at the ends of the field will impact the displacement error. Nevertheless, anticipation or control of speed changes by software reduces error from this vehicle acceleration and deceleration. Consequently, with selective availability turned off, GPS receiver 20 provides a suitable primary speed measurement.

The location system 10 also includes a radar gun 24. When selective availability is enabled GPS receiver 20 does not provide sufficient accuracy so radar gun 24 provides a radar speed signal on line 26 to position computer 18 via a communication link 29. Thus, with selective availability turned on the radar speed signal on line 26 is used by position computer 18 as the main measurement of vehicle speed. Moreover, even if selective availability is turned off, the GPS signals may be obstructed by buildings, mountains, or the like. Thus, in the event that GPS signals are obstructed, the speed information is obtained from radar gun 24 instead of GPS receiver 20. In addition, at low speeds under 1 m.p.h. the radar speed signal 26 provided by radar gun 24 is used by position computer 18 as the main speed measurement of the vehicle speed even if selective availability is turned off. This is because at speeds below 1 m.p.h. GPS receiver 20 does not provide adequate accuracy. Radar gun 24 can be implemented with any Doppler ground radar or ultra-sonic speed sensor mountable on the vehicle which provides an error of approximately 1%–5%. A suitable radar gun is a Dickey John Radar Gun II ground speed sensor which provides less than 3% error and potentially under 1% error at speeds over 4.8 k.p.h. A less accurate and less expensive method of obtaining speed information would be with a wheel rotation counter. However, wheel rotation counters, such as odometers, do not work well in agricultural applications because of the low speeds and wheel slippage in wet fields. The error range of a rotation counter odometer is approximately 5%–10%.

Flux compass 12 can be implemented with various flux compasses currently available such as the KVH C100 flux compass. The KVH C100 flux compass has a rating of ±0.5° accuracy, ±0.2° repeatability, and 0.1° resolution. New headings are provided every 0.1 second. In tests, the KVH C100 flux compass provided a heading signal within ±0.2° of the average reported value 99% of the time when the vehicle is at rest. A factor in the above accuracy is the magnetic impact of the host system. The error introduced from this source remains nearly constant once the compass is installed and calibrated. Therefore, in the field, the host error may be derived by comparing the average heading on the first pass over the field with a reference such as a fence line. Software in position computer 18 can then be utilized to compensate for this fixed error in the following passes.

A flux compass is used to provide the heading information along with the GPS receiver 20 because GPS receivers such as the Tremble Acutime receiver do not update heading information at speeds below 8 k.p.h. As mentioned above, a flux compass such as the KVH C100 flux compass provides heading information even when the vehicle is not moving. Nevertheless, the heading information provided by GPS receiver 20 can be used to calibrate flux compass 12 by driving the vehicle down a straight path, such as a straight road, at a sufficiently high speed for a sufficient period of time. Since GPS heading is also impacted by selective availability being turned on, the flux compass can also be calibrated by knowing the direction of the straight path. GPS heading is provided relative to true north. Flux compass heading is provided relative to magnetic north. The difference between true north and magnetic north heading varies with geo-position. For example, in Minneapolis, Minn. there is substantially no difference between true and magnetic heading, but in Eastern North Dakota the difference is approximately 6°, and in Western North Dakota the difference is approximately 15°. Another possible source of flux compass heading error results if flux compass 12 is skewed during mounting on the vehicle, because the heading is provided relative to the front portion of the compass. Nearby steel and iron provide another possible source of flux compass heading error, which can be as high as 30°. Thus, the compass needs to be mounted at least several feet from magnetic material and needs to be calibrated to take nearby metal into account. Since the GPS receiver is not impacted by the geo-position of the vehicle or by nearby metal, the GPS receiver is useful in calibrating the flux compass. Without the GPS receiver, the flux compass can be calibrated to account for the geo-position of the vehicle by storing geo-position information of the field in position computer 18 to compensate for the difference between the true and magnetic heading signals.

As mentioned above, GPS receiver 20 and radar gun 24 are utilized together to obtain the current heading of the vehicle for location system 10. The current heading of the vehicle is calculated by position computer 18 using the following heading algorithm.

```
Heading Algorithm Inputs:    gpsSpeed = speed value obtained from
                                        GPS receiver 20
                             curSpeed = current speed as derived by
                                        position computer 18
                             fcHead   = heading value provided by
                                        flux compass 12
                             gpsHead  = heading value provided by
                                        GPS receiver 20
                             lastHead = the last heading value
                                        derived by position
                                        computer 18
Heading Algorithm Output:    curHead  = the current heading value of
                                        the vehicle
Heading Algorithm:
    IF (curSpeed = 0 mph) THEN
        curHead = fcHead
    ELSE IF (|lastHead - gpsHead| > 5°)
        AND (gpsSpeed > 5 mph) THEN
    curHead = gpsHead
    ELSE IF (|fcHead - lastHead| > 0.3°) THEN
        IF (fcHead > lastHead) THEN
            curHead = lastHead + 0.3°
        ELSE
            curHead = lastHead - 0.3°
        END IF
    ELSE
        curHead = fcHead
    END IF
    Wherein |X| returns the absolute value of X
```

This algorithm takes into account that at rest, the flux compass returns a heading within ±0.2° of the average reported value 99% of the time. However, when in motion, the flux compass has a very large variation in the reported heading. Thus, the algorithm assumes that in a straight path, true heading will vary by no more than 0.3° per 0.1 second sample interval. In the case of flux compass 12 being implemented in the KVH C100 flux compass, the sample rate is one reading every 0.1 second. Thus, flux compass heading changes are limited to a rate of 0.3° per 0.1 second. Accordingly, GPS receiver 20 is utilized to detect heading changes associated with turns and other non-straight line maneuvers. Even though selected availability impacts the accuracy of the GPS heading signal, changes in heading are easily detected. The problem that arises because GPS heading values are only available at speeds above 8 k.p.h. is discussed below.

The current heading calculated by this algorithm yielded approximately a 3% position error when combined with radar speed data from radar gun 24 in a test where a vehicle was driven around the perimeter of an area with an irregularly shaped perimeter measuring approximately 1600 meters. Part of this position error is due to flux compass motion caused by vehicle acceleration and vibration. Digital filtering of the flux compass heading signal on line 16 filters out high-frequency noise adequately when the vehicle is moving in substantially a straight line. The digital filtering can be implemented in a commercially available dedicated digital signal processing chip. Alternatively, the digital filtering can be accomplished by employing special software in position computer 18. However, the digital filtering does not satisfactorily track the flux compass heading signal when the vehicle has abrupt direction changes such as in negotiating turns. Again, the GPS heading signal is used to detect such abrupt heading changes so the digital filtering only has to track the flux compass heading signal during substantially straight sections of vehicle movement.

A suitable position computer 18 is a Motorola MC68HC11 EVB single board computer. If the EVB computer is used, a RS-232 serial link is used for communication link 23 to couple the GPS position, speed, and heading signals on line 22 to computer 18. Data is transferred from flux compass 12 to an EVB computer using a synchronous serial communication link for communication link 17. The radar gun signal is a square wave with a frequency proportional to speed. Thus, data is transferred from radar gun 24 to the EVB computer using any suitable known type of communication link capable of handling this type of square wave signal for communication link 29. The EVB computer has a clock measuring system time in 0.1 second increments which is compatible with the heading signals from the KVH C100 flux compass 12 provided every 0.1 second.

Flux compass 12, GPS receiver 20, radar gun 24, and positioning computer 18 form a dead reckoning system. As with a typical dead reckoning system, the vehicle starts at a known point or initial position, for example, the corner of a farm field. As the vehicle moves from the known starting point, the heading information and the speed information are integrated over time by position computer 18 producing a heading value and a speed value respectively. Computer 18 calculates a displacement value as a function of the heading value, the speed value, and the starting point. The displacement value indicates vehicle displacement relative to the starting point occurring during a selected time interval. A current position signal is derived by computer 18 based on the displacement value for all time intervals since the start of vehicle movement. The current position signal is provided on lines 27, 31, and 33.

In traditional dead reckoning systems, the difference between the true position and the calculated position grows over time. This difference or error is a result of the speed and heading errors being integrated over time along with the true speed and true heading values. The present invention as embodied in location system 10, limits the dead reckoning error through map matching and position corrections. A geographical information system (GIS) 34 stores a map, indicated at 36, of the area in which the vehicle will operate in a GIS database 35. Map 36 comprises a plurality of records with each record including geographic information data representing selected aspects of the area. GIS 34 also contains stored information about the area of vehicle operation which serves as navigation checkpoint locations, indicated at 38, for correcting the current position signal. In the case of a farm implement, the checkpoint locations can include the ends of the field, objects inside the field, and objects outside the field. Examples of checkpoint locations include field boundaries, a portion of the field already traversed, hill crests, valley troughs, trees, rocks, wet spots, utility poles and the like. GIS 34 typically also contains instructions for vehicle operation, such as application rates. GIS 34 also typically records the actions taken by the vehicle or farm implement. In optional embodiments of the present invention, the navigation and task functions of GIS 34 can be implemented in separate GIS units.

The task GIS unit is a data base in which data is referenced by a geographic tag. In precision agriculture, a GIS database stores information such as weed maps, soil attributes, soil test results, pest infestation, climate, terrain, hydrography, agricultural chemical needs, and previous yields to a fine resolution. This data is used to regulate location-specific application of agricultural chemicals and seed. The data can also be used for farm accounting and cost management or other precision agriculture applications. In this regard, position computer 18 provides an alerting signal on line 40 based on the current position signal and geographic information data stored in GIS database 35. The alerting signal on line 40 indicates that the vehicle has reached a selected region within the field. In response to the alerting signal, the vehicle will perform some specific action such as activating actuators to apply chemicals or seed at a specified rate for a selected region within the field.

For planting, fertilizing, and other chemical applications, the current position signal provided on line 27 from computer 18 serves as an index into GIS database 35 stored in GIS unit 34. Since GIS database 35 contains application rate information for each section of the field, the rate information is sent to the implement which makes the necessary adjustments to actuators and other application devices so that the proper amount of crop related substances is applied to each section of the field. Other agricultural related activities can use the geo-position information provided by location system 10. Examples of such agricultural activities include identifying soil test locations, pesticide applications, and harvesting. In addition, in the near future the Environmental Protection Agency (EPA) and other federal agencies will most likely have regulations requiring strict chemical application records. Location system 10 will allow application records to be recorded based on applications to selected regions within an area to comply with these regulations. In addition, location system 10 can be used in non-agricultural off road location indexed database applications such as in recording the dumping of waste materials according to geo-position locations.

A user or interactive interface 28 provides a method for a human operator to interact with location system 10. User interface 28 includes a keyboard 30 or similar input device which permits the operator to input information into position computer 18 on line 33. User interface 28 also includes a display 32 which permits the operator to see information provided by position computer 18 on line 31. User interface 28 is preferably implemented in a personal computer which performs data logging in addition to displaying the current position and other information. When user interface 28 is implemented in a personal computer, keyboard 30 and display 32 are implemented with input/output (I/O) devices contained in the personal computer. Keyboard 30 and display 32 can also be implemented in I/O devices from another communication link to position computer 18 through an RS-232 serial port or other off-the-shelf connection device. If the entire location system 10 is fully automated an interactive interface may not be required.

Display 32 optionally reports system status to the operator and prompts the operator for a response. Display 32 optionally includes a map of all or part of the area of vehicle operation along with the current vehicle location. Position can be indicated as a point on the map, as latitude and longitudinal, or as a linear offset from the starting point. In the preferred embodiment, the current position is displayed as north and east offsets from an initial position represented as (0,0).

Position computer 18 monitors initialization of GPS receiver 20 and flux compass 12 when system power is turned on. Position computer 18 also prepares messages containing various system 10 information such as the system time, flux compass heading, GPS position, GPS speed, GPS heading, radar gun speed, and system status. The system messages are then conveyed 10 times per second to user interface 28 which logs the data. The system information can be displayed on display 32.

An example of the accuracy of navigation system 10 is illustrated by assuming:

| | |
|---|---|
| Field size: | 1500 meters × 1500 meters |
| Vehicle width: | 40 meters (two 20 meter booms) |
| Vehicle speed: | 15 kilometers per hour (9.4 MPH) on turns |
| | 30 kilometers per hour (18.8 MPH) on straight-aways |

With these assumptions, using the KVH C100 flux compass with a 0.2° repeatability figure as the main error on straight flat segments, in the worse case, the heading would be off 0.2° for the full 1500 meter length of the field, resulting in a 5.25 meter displacement from the desired line of travel at the field end due to the flux compass error. However, in practice, the repeatability errors should cancel each other to some degree over time. For each 0.1 seconds, with a speed of 30 kilometers per hour, the maximum displacement for 0.2° is 0.03 meter.

Assuming a 20 meter turning radius and a turning speed of 15 kilometers per hour, a 180° turn will take about 15 seconds. This results in a 1.2° change in heading per 0.1 second sample period, which is readily detected by position computer 18 based on changes in the GPS heading signal values provided by GPS receiver 20, particularly if software in position computer 18 anticipates the turn. Anticipation software can also be used to differentiate between a real turn and operator error or any operator action. Even though GPS receiver 20 typically does not provide a heading signal at speeds below 8 k.p.h., the changes in the GPS speed signal values due to the vehicle slowing to negotiate the turn are detected by position computer 18. Thus, changes in the GPS heading signal values or changes in the GPS speed signal values indicate to position computer 18 that the vehicle is turning.

The linear displacement from the speed and heading information in a curved path of a vehicle resulting from the vehicle negotiating a turn is compensated for by position computer 18 through simple known geometry calculations. However, the correction performed by position computer 18 is more difficult in practice than in theory since actual vehicle speed is not constant and the turn will not be an ideal circle.

As mentioned above, if selected availability is turned off, GPS receiver 20 provides an adequate speed measurement of the vehicle speed. In this case, the value of the GPS speed signal is reference to distances covered in the X-Y plane only and does not consider elevation changes of the vehicle when the vehicle is moving over rolling terrain. However, when selected availability is turned on and the radar gun is required to provide adequate speed information, the radar gun speed signal provides speed information based on the distance the vehicle travels in X-Y-Z space, which includes the distance variations due to the elevation changes of the vehicle. Consequently, an optional inclinometer 42 is used to separate the Z component from the X and Y components of the radar speed information provided by radar gun 24. Inclinometer 42 provides an inclinometer signal on line 44 to position computer 18 via a communication link 46. Again, if position computer 18 is implemented in an EVB computer, communication link 46 is implemented with any suitable known type of communication link such as a synchronous serial communication link.

Inclinometer 42 is also useful in detecting elevation and slope information for use by GIS 34 for application rates which depend on elevation and slope. In addition, elevation and slope data can be utilized when location system 10 is used to obtain soil sampling data.

Figure 2:
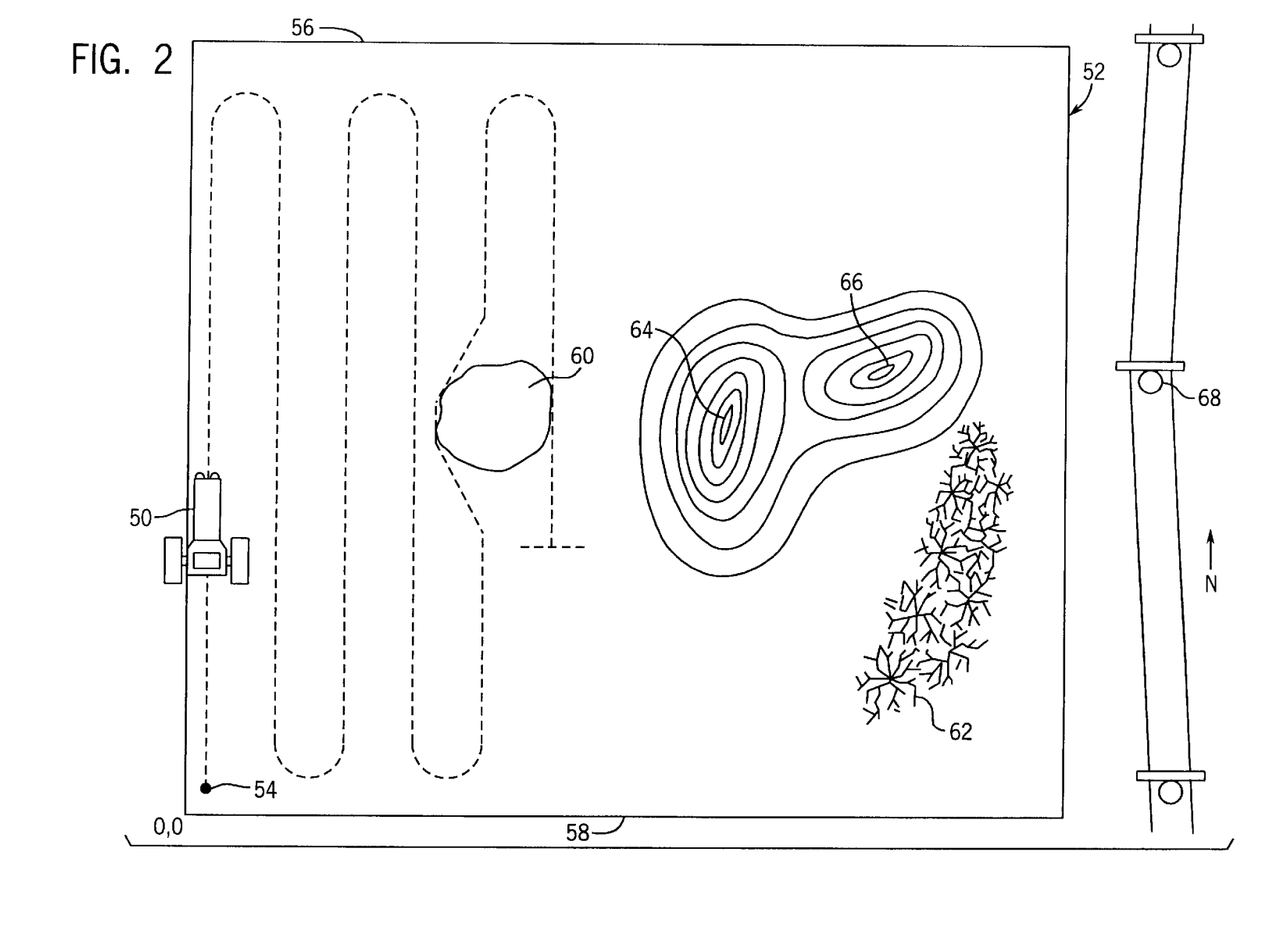
FIG. 2 is a diagram of a field illustrating the movement of a vehicle utilizing the navigational system illustrated in FIG. 1.

FIG. 2 illustrates the path of a farm implement 50 which uses location system 10. Farm implement 50 is assumed to be 60 feet wide and operates within the boundaries of a field 52. Farm implement 50 has an initial position or starting point indicated at 54 with coordinates 0,0 in the southwest corner of the field. As indicated above, the current position is indicated by north and east offsets from the initial position (0,0). Checkpoint locations 38 are used to correct one or both position offsets from the starting point 54. As diagramed in FIG. 2, farm implement 50 takes north/south passes covering field 52. As farm implement 50 travels north from the initial position 54, the heading signal on line 16 indicates to position computer 18 that implement 50 is travelling north while the radar speed signal on line 26 indicates the speed of implement 50. Thus, position computer 18 calculates the offset from initial position 54 as a function of the heading signal and the radar speed signal. When implement 50 reaches a north perimeter, indicated at 56, of field 52, implement 50 turns around to start traveling south toward a south perimeter, indicated at 58, of field 52. While implement 50 negotiates the turn from north to south, GPS receiver 20 senses the change in heading from north then to east then to south and the change in heading is accordingly indicated with the GPS heading signal on line 22 and sent to position computer 18. Position computer 18 recognizes this as a turn around from north to south due to implement 50 reaching the north perimeter 56 of field 52. Consequently, north perimeter 56 acts as a checkpoint location which is stored as a checkpoint location 38 in GIS 34 indicating that position computer 18 should correct the offset from initial position 54. Thus, the desired maximum error of location system 10 is ±10 meters during one pass of the field without checkpoint correction, because system 10 can correct the current position signal at every turn around. In this way, location system 10 can maintain the ±10 meter precision required for the soil-test sample level of precision.

Position computer 18 corrects the north/south offset when implement 50 is headed east to equal the north perimeter 56 minus half of the implement width, or thirty feet in the case of implement 50. Similarly, when the heading indicated by the heading signal on line 16 indicates a change to a due south for the return, the east offset is corrected by position computer 18 to equal 1½ implement widths, or 90 feet in the case of implement 50, to the east of the north going path of implement 50. A similar offset correction is performed by position computer 18 when implement 50 reaches south perimeter 58 and makes a turn around to start its north journey towards north perimeter 56.

As mentioned above, mid-field waypoints or regions within or outside the field also operate as navigation checkpoint locations to be stored as checkpoint locations 38 in GIS 34. Mid-field waypoints can be added to reduce dead reckoning error if the dead reckoning of system 10 produces more than ±10 meters of error during one pass of the field. Mid-field waypoints can also be added to provide correction for operator avoidance of mid-field objects. The mid-field waypoints or checkpoint locations illustrated in FIG. 2 are a rock pile 60, trees 62, hill crest 64, and valley low 66. In addition, a utility pole 68 illustrates a checkpoint location outside of field 52. On board sensors may be used to detect mid-field waypoints. For example, inclinometer 42 is optionally mounted on the vehicle to detect when a hill crest or valley low has been reached. Accelerometers and altimeters are other optional supplements to location system 10. In addition, beacons can be set up at known locations to enhance accuracy. On board sensors receive the signals from the beacons and produce signals which can be used by computer 18 to make the offset corrections. The on-board sensors can be implemented with a variety of sensors such as sensors which respond to signals in the radio, infrared, or visible parts of the spectrum. By using the beacons in this manner, no operator intervention is required and the beacon signals do not have to be continuously available. By contrast, beacon only based field location systems require that the signal from the beacons be continuously available.

In one mode of operation, position computer 18 automatically detects operator avoidance moves as a function of the variance in the heading indicated by either flux compass 12 or GPS receiver 20. Optionally, the operator of implement 50 is prompted through display 32 to enter a planned path through the field through keyboard 30 to facilitate automatic corrections. Another optional feature of the present invention allows the user to indicate when the implement has reached a waypoint or checkpoint location. In this mode of operation, user interface 28 monitors implement 50 position and identifies the approach to relevant waypoints. User interface 28 then prompts the operator to respond when the waypoint is reached or when the vehicle is at a specified position relative to the waypoint. For example, display 32 may prompt the operator to "hit any key when hill peak is reached" or may prompt "press {Enter} when the big oak tree is immediately to the left." If the operator does not respond, the prompt on display 32 goes away and no correction is made to the current position signal provided on lines 27, 31, and 33. If the operator responds, one or both offsets from the initial position are modified. The information that implement 50 has reached a checkpoint, through input from the operator or through automatic detection, is used by position computer 18 to correct the offset from initial position 54 to maintain the ±10 meter accuracy of location system 10.

Map 36 and checkpoint locations 38 can be formed and stored in GIS database 35 through various methods. A first method uses existing maps and/or aerial photos to obtain field features of interest. Checkpoint locations are then entered based on the existing sources.

A second method uses the location system 10 itself to generate map 36 and checkpoint locations 38. For example, in reference to FIG. 2, vehicle 50 is driven around the perimeter of field 52 to ascertain the area of operation of vehicle 50 during the application of chemicals or seed. Vehicle 50 is then driven to checkpoint features such as indicated by rock pile 60, trees 62, hill crest 64, valley low 66, and utility pole 68. User interface 28 permits an operator to enter the appropriate description of each checkpoint location such as location, size, elevation, and the vehicle position relative to the checkpoint location when the checkpoint location is considered to be reached by the vehicle.

In any case, once the map 36 and checkpoint locations 38 are formed and stored in GIS 34, the map and checkpoint locations are preferably also stored in a non-volatile memory which is compatible with position computer 18. For example, the map and checkpoint locations are optionally stored on a floppy disc if position computer 18 is implemented in a personal computer.

Figure 3:
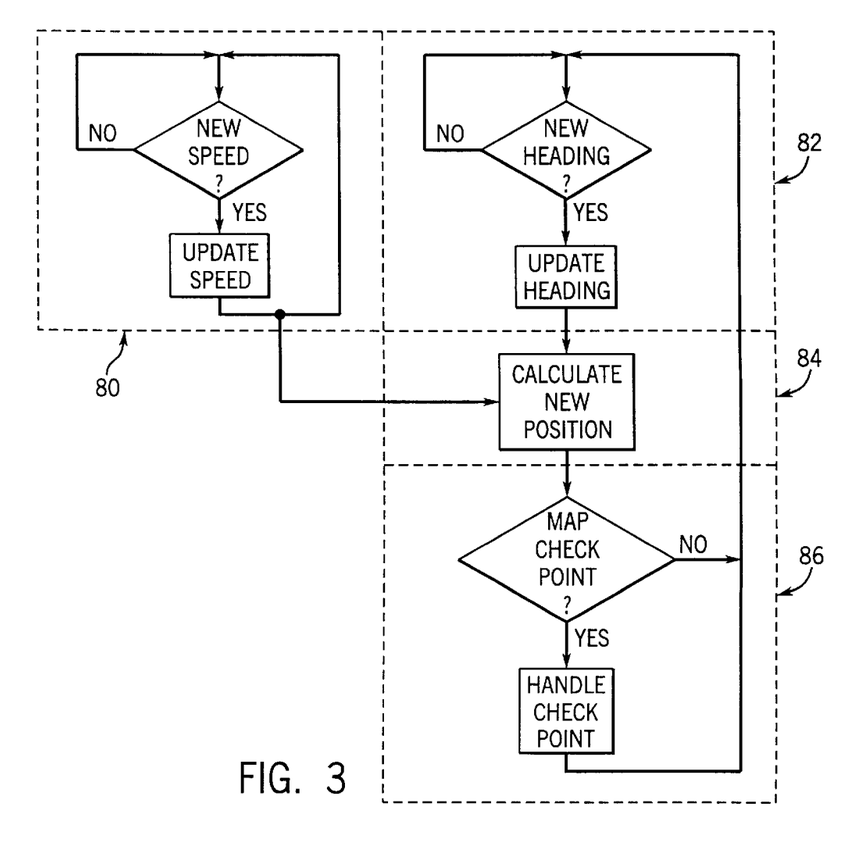
FIG. 3 is a flow chart illustrating operation of the navigational system illustrated in FIG. 1.

An algorithm to update the current position of the vehicle in the area, such as the position of implement 50 in field 52, is illustrated in a flow chart in FIG. 3. The particular algorithm used will vary depending on the type of flux compass, GPS receiver, and radar gun used in location system 10. Nevertheless, for clarity the flow chart of FIG. 3 does not show how the heading and speed values are actually provided to position computer 18. The detail of how the speed and heading values are obtained is discussed above. Referring to FIG. 3, an update speed process or task, indicated generally at 80, waits for GPS receiver 20 to indicate that the vehicle is traveling at a new speed by monitoring the speed signal on either line 22 or line 26 depending on if selective availability is turned on. When the speed signal indicates a new speed value, this value can be directly substituted as the new value for the current speed of the vehicle. Alternatively, the new speed value is used in a calculation to derive a new speed value from the current and previous historical values such as if a digital filter is used to level the speed values.

A process or task 82 responds to the current heading value, provided by the heading algorithm discussed above, indicating that a new heading of the vehicle has been sensed by either flux compass 12 or GPS receiver 20. When position computer 18 receives the new value for the heading, this heading value can be directly substituted as the new value for the heading of the vehicle. Alternatively, the new heading value is used in a calculation to derive a new heading value from the current and previous historical values, such as if a digital filter is used to level the heading values.

The updated speed from task 80 and the updated heading from task 82 are received by a task 84 which calculates a new position of the vehicle at selected time intervals. North and east displacements from the initial position of the vehicle in the corresponding selected time interval are calculated using well known trigonomic functions. This new total displacement is sent to GIS 34. In response to the new total displacement, GIS 34 ascertains if a map checkpoint 38 is nearby. If there is not a checkpoint nearby, a task, indicated at 86, waits for the next new total displacement value to arrive. If a map checkpoint is nearby task 86 handles the checkpoint location. For example, the vehicle response that is desired in response to this checkpoint can be handled automatically through automatic adjustment of the vehicle. Alternatively, task 86 signals display 32 to prompt the vehicle operator to verify the checkpoint location so that the current position signal provided on lines 27, 31, and 33 can be corrected.

Location system 10 provides position information which is comparable to differential GPS. Moreover, the estimated material cost for implementing a location system 10 is ⅓ to ½ that of a differential GPS system. Moreover, both the base station and the communication link to the mobile GPS receiver are eliminated with the current invention. This communication link requires radio modems to transmit the differential GPS corrections. The extra equipment significantly increases the system cost for differential GPS. Moreover, a FCC license is required for this communication which can be time consuming to obtain. Location system 10 provides positioning information without the need for a FCC license. Thus, with this lower cost yet economical location system, precision agricultural becomes economically viable.

Although the present invention has been described with reference to preferred embodiments, workers skilled in the art will recognize that changes may be made in form and detail without departing from the spirit and scope of the invention.

What is claimed is:

1. A system for navigating a farm vehicle in an agricultural field, comprising:
   a digital data processor;
   a satellite sensor coupled to the processor and configured to provide data indicative of the vehicle's current location within the field;
   a digital memory coupled to the processor and configured to store a database comprising a plurality of records, each record including geographic position data for a location within the field and corresponding data indicative of characteristics of that location wherein the characteristics include soil attributes; and
   a display coupled to the processor, the processor configured to access the database to deliver a signal to an operator of the vehicle when the vehicle's current location indicates that the vehicle has reached a selected region within the field having selected characteristics.

2. The system of claim 1 wherein the satellite sensor is a GPS receiver.

3. The system of claim 2 wherein the satellite sensor is configured to provide a geo-position signal.

4. The system of claim 1 further comprising an actuator coupled to the processor and configured to apply substances to the field in response to an alerting signal at a plurality of application rates, and wherein the processor is further configured to provide the alerting signal.

5. The system of claim 1 wherein the corresponding data indicative of characteristics of locations in the field is used to regulate the application of chemicals and seeds to the field.

6. The system of claim 1 wherein the corresponding data indicative of characteristics of locations in the field includes application rate information for the application of crop related substances to the field.

7. A process for navigating a farm vehicle in an agricultural field, comprising the steps of:
   storing a plurality of records in a database, each record including geographic position data for a location within the field and corresponding data indicative of characteristics of that location wherein the characteristics include soil attributes;
   providing data indicative of the vehicle's current location within the field;
   delivering a conditional alert to an operator of the vehicle when the vehicle reaches a selected region within the field coinciding with the geographic position data of selected characteristics in the database.

8. The process of claim 7 wherein the step of providing data indicative of the vehicle's current location includes the steps of receiving GPS signals.

9. The process of claim 8 wherein the step of providing data indicative of the vehicle's current position includes the step of providing a geo-position signal.

10. The process of claim 7 further comprising the step of applying substances to the field in response to an alerting signal provided by the processor at a plurality of application rates.

11. The process of claim 7 further including the step of using the corresponding data indicative of characteristics of locations in the field to regulate the application of chemicals and seeds to the field.

12. The process of claim 7, wherein the corresponding data indicative of characteristics of locations in the field includes application rate information for the application of crop related substances to the field.

13. A location system for use in a farm vehicle moving within an agricultural field having a perimeter and moving in a selected direction, the location system comprising:
   a satellite sensor and a second heading sensor configured to provide a plurality of current heading signals representative of the current selected direction of movement of the vehicle from those available to be chosen during the operation of the vehicle in the agricultural field;
   a signal selector configured to select between the plurality of heading signals;
   a speed sensor configured to provide a current speed signal representative of a current speed of the vehicle;
   a first memory configured to store initial position data indicative of a selected initial position of the vehicle and for storing checkpoint data indicative of a position of a navigation checkpoint;
   a digital memory configured to store a plurality of records, each record including geographic information data representing selected attributes of the field including soil attributes and corresponding positional data;
   a processor configured to estimate a current position signal representing an estimated current position of the vehicle based on values of the selected heading signal; values of the speed signal, the initial position data, and on previous values of the current position signal, wherein values of the current position signal correspond to records stored in the digital memory, and wherein the processor includes a correction circuit for selectively correcting the current position signal based on selected position inputs which indicate an approximate vehicle position relative to the position of a navigational checkpoint, and an alerting circuit for delivering an alerting signal to an operator of the vehicle based on the current position signal and the geographic information data stored in the digital memory, the alerting signal indicative of the vehicle reaching a selected region of predetermined stored geographic data within the field; and
   a user interface adapted to receive position inputs from the operator.

14. A navigation system for navigating an agricultural vehicle in an agricultural field for precision farming, comprising:
   a satellite navigation receiver configured to generate a geo-position signal;

a processor coupled to the satellite navigation receiver and configured to receive the geo-position signal;

a digital memory coupled to the processor to receive and store a plurality of records, each such record including geographic information data representing selected aspects of the field including soil attributes and corresponding positional data;

a display device coupled to the processor and adapted to deliver an alert to the operator of the vehicle based upon a current position of the vehicle and the geographic information data stored in the digital memory, the alert indicative of the vehicle reaching a selected region of predetermined stored geographic data of selected soil attributes within the field.

15. The navigation system of claim 14 wherein the processor is configured to estimate the current position of the vehicle based upon the geo-position signal.

16. The navigation system of claim 14 wherein the alert is indicative of the system status.

17. The navigation system of claim 14 wherein the alert is indicative of arrival at a waypoint.

18. A system for navigating a farm vehicle in an agricultural field, comprising:

a digital data processor;

a satellite sensor coupled to the processor and configured to provide data indicative of the vehicle's current location within the field;

a digital memory coupled to the processor and configured to store a database comprising a plurality of records, each record including geographic position data for a location within the field and corresponding data indicative of characteristics of that location wherein the characteristics include soil attributes including at least a seed application rate for that location used to regulate the application of seeds to the agricultural field; and a display coupled to the processor, the processor configured to access the database to deliver a signal to an operator of the vehicle when the vehicle's current location indicates that the vehicle has reached a selected region within the field having selected characteristics.

19. A system for navigating a farm vehicle in an agricultural field, comprising:

a digital data processor;

a satellite sensor coupled to the processor and configured to provide data indicative of the vehicle's current location within the field;

a digital memory coupled to the processor and configured to store a database comprising a plurality of records, each record including geographic position data for a location within the field and corresponding data indicative of characteristics of that location wherein the characteristics include soil attributes; and a display coupled to the processor and configured to deliver a signal to an operator of the vehicle when the vehicle reaches a selected region within the field coinciding with the geographic position data in the database as determined by at least one datum indicative of a selected characteristic of that selected region, wherein the corresponding data indicative of characteristics of locations in the field is used to regulate the application of chemicals and seeds to the field.

20. A process for navigating a farm vehicle in an agricultural field, comprising the steps of:

storing a plurality of records in a database, each record including geographic position data for a location within the field and corresponding data indicative of characteristics of that location, wherein the characteristics include soil attributes and the soil attributes include at least a seed application rate for that location used to regulate the application of seeds to that location of the agricultural field;

providing data indicative of the vehicle's current location within the field;

delivering a conditional alert to an operator of the vehicle when the vehicle reaches a selected region within the field coinciding with the geographic position data in the database and having at least one selected soil attribute.

21. A navigation system for navigating an agricultural vehicle in an agricultural field for precision farming, comprising:

a satellite navigation receiver configured to generate a geoposition signal;

a processor coupled to the satellite navigation receiver and configured to receive the geoposition signal;

a digital memory including geographic information data including seed application rates and used to regulate location-specific application of seeds coupled to the processor and adapted to deliver an alert to an operator of the vehicle based upon a current position of the vehicle and the geographic information data including seed application rates stored in the digital memory, the alert indicative of the vehicle reaching a selected region of predetermined stored geographic data within the field including a selected seed application rate.

* * * * *